(12) United States Patent
Parry et al.

(10) Patent No.: US 7,031,013 B2
(45) Date of Patent: Apr. 18, 2006

(54) IMAGE FORMING DEVICES AND CONSUMABLE MARKETING METHODS

(75) Inventors: Travis J. Parry, Boise, ID (US); Robert Sesek, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 877 days.

(21) Appl. No.: 09/861,214

(22) Filed: May 18, 2001

(65) Prior Publication Data
US 2002/0171866 A1 Nov. 21, 2002

(51) Int. Cl.
*B41J 1/00* (2006.01)
*G03G 21/10* (2006.01)

(52) U.S. Cl. .............. 358/1.16; 358/1.15; 399/24; 399/61; 347/19

(58) Field of Classification Search ............... 358/1.15, 358/1.16; 399/9, 12, 25, 26, 27, 28, 29, 30, 399/35, 61, 110, 111, 119, 120, 258, 262, 399/24; 347/19, 7
See application file for complete search history.

(56) References Cited

U.S. PATENT DOCUMENTS

| | | | |
|---|---|---|---|
| 5,049,898 A | 9/1991 | Arthur et al. | |
| 5,491,540 A | 2/1996 | Hirst | |
| 5,699,091 A | 12/1997 | Bullock et al. | |
| 5,850,583 A * | 12/1998 | Song et al. | 399/24 |
| 5,956,487 A | 9/1999 | Venkatraman et al. | |
| 6,151,041 A * | 11/2000 | Bolash et al. | 347/19 |
| 6,170,007 B1 | 1/2001 | Venkatraman et al. | |
| 6,233,408 B1 * | 5/2001 | Allen | 399/8 |
| 6,714,744 B1 * | 3/2004 | Arima | 399/23 |
| 6,816,279 B1 * | 11/2004 | Izumi et al. | 358/1.16 |
| 6,913,195 B1 * | 7/2005 | Shinkai | 235/381 |
| 2002/0002492 A1 * | 1/2002 | Okazawa | 705/14 |
| 2002/0057447 A1 * | 5/2002 | Kawaguchi | 358/1.15 |
| 2002/0116204 A1 * | 8/2002 | Willner et al. | 705/1 |

* cited by examiner

*Primary Examiner*—King Y. Poon
*Assistant Examiner*—Lucas Divine

(57) ABSTRACT

Image forming devices and consumable marketing methods are provided. An image forming device according to one aspect includes: an image engine configured to use a consumable to form a plurality of hard images; and processing circuitry coupled with the image engine and configured to control the formation of the hard images, the processing circuitry being further configured to monitor a state of the consumable of the image forming device, to access price information regarding the consumable of the image forming device, and to communicate a message including the price information responsive to the monitoring.

22 Claims, 2 Drawing Sheets

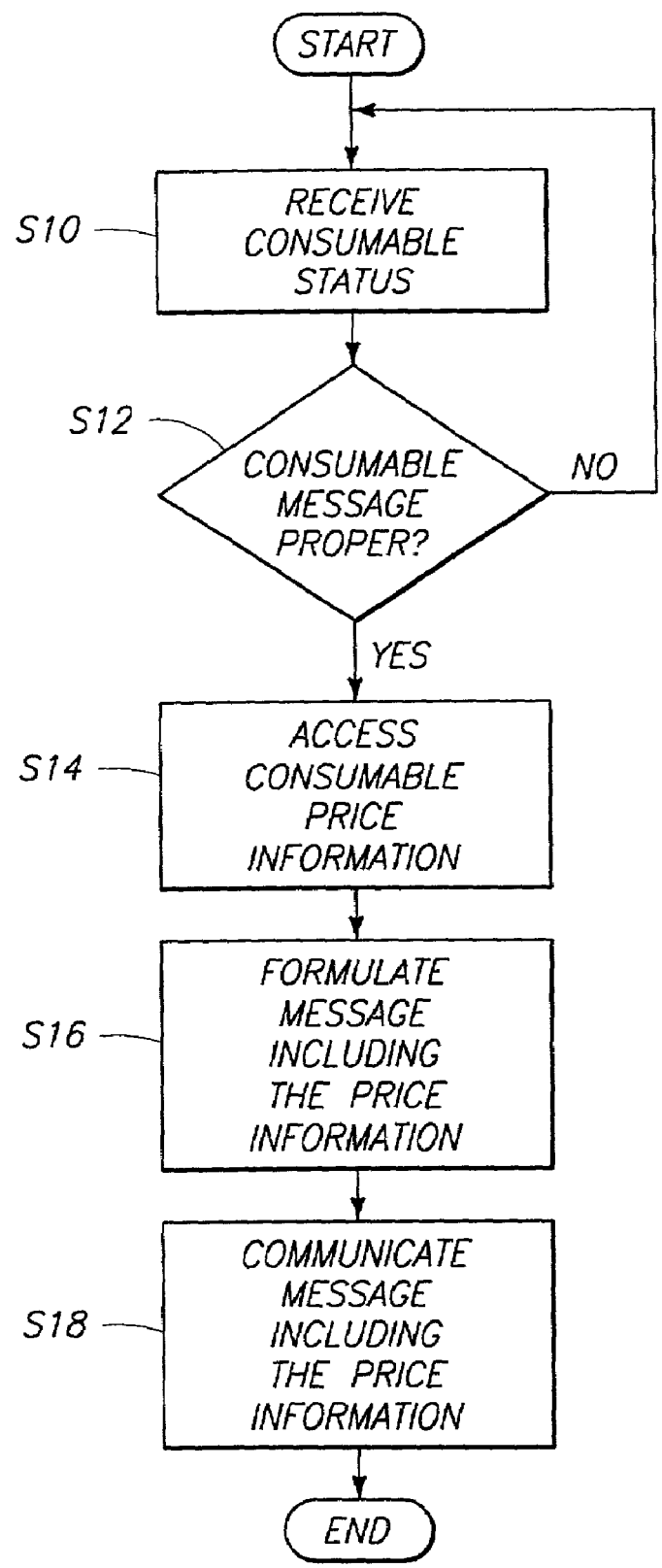

IMAGE FORMING DEVICES AND CONSUMABLE MARKETING METHODS

FIELD OF THE INVENTION

The invention relates to image forming devices and consumable marketing methods.

BACKGROUND OF THE INVENTION

Image forming devices have increased in popularity, sophistication and capabilities. Examples of image forming devices include laser printers, ink jet printers, thermal printers, etc. These devices have capabilities to print monochrome images or color images. During imaging operations, numerous consumables may be utilized by a given image forming device to form images. For example, consumables including imaging media (e.g., paper, transparencies), marking agents (e.g., toner), etc. Are utilized to complete desired jobs.

Suppliers of image forming devices may also provide these consumables for use in their respective image forming devices. Usage of such consumables is desired inasmuch as the genuine consumables typically fully comply with strict standards and specifications set for operation within a given image forming device. Within recent years, other parties have aggressively marketed replacement consumables for use in such image forming devices. Often, these consumable products are inferior and fail to meet the proper standards and specifications for consumables to be used in a given image forming device. Usage of third party consumables may result in inferior operation, inferior image quality, malfunction or damage of the image forming device, or other associated drawbacks.

It is desirable for manufacturers to instill consumer confidence in usage of quality consumables supplied by the manufacturer or other designated supplier to avoid problems with the operation of the devices. Accordingly, devices and methodologies for marketing consumables to users of image forming devices are desired.

SUMMARY OF THE INVENTION

The present invention includes image forming devices and consumable marketing methods.

One aspect of the invention provides an image forming device comprising: an image engine configured to use a consumable to form a plurality of hard images; and processing circuitry coupled with the image engine and configured to control the formation of the hard images, the processing circuitry being further configured to monitor a state of the consumable of the image forming device, to access price information regarding the consumable of the image forming device, and to communicate a message including the price information responsive to the monitoring.

A second aspect of the invention provides a consumable marketing method comprising: providing an image forming device configured to use a consumable to form a plurality of hard images; monitoring a state of the consumable of the image forming device; accessing price information regarding the consumable of the image forming device; and communicating a message including the price information of the consumable responsive to the monitoring.

Another aspect of the invention provides a consumable marketing method comprising: providing a printer configured to use a consumable to print a plurality of hard images; providing a host device configured to communicate with the printer; accessing price information regarding the consumable from the consumable; monitoring a state of the consumable; formulating a message regarding the consumable comprising a coupon including the price information; and communicating the message responsive to the monitoring, the communicating comprising at least one of printing the message and outputting the message to the host device.

According to another aspect, a consumable marketing method comprises: registering a plurality of image forming devices individually configured to use a consumable to form a plurality of hard images; providing price information of the consumable; communicating the price information of the consumable to the registered image forming devices; and communicating a message including the price information of the consumable using the image forming devices. Other devices and methods according to other aspects are disclosed below.

DESCRIPTION OF THE DRAWINGS

FIG. 3 is a flow chart illustrating exemplary operations of processing circuitry of the image forming device.

DETAILED DESCRIPTION OF THE INVENTION

Figure 1:
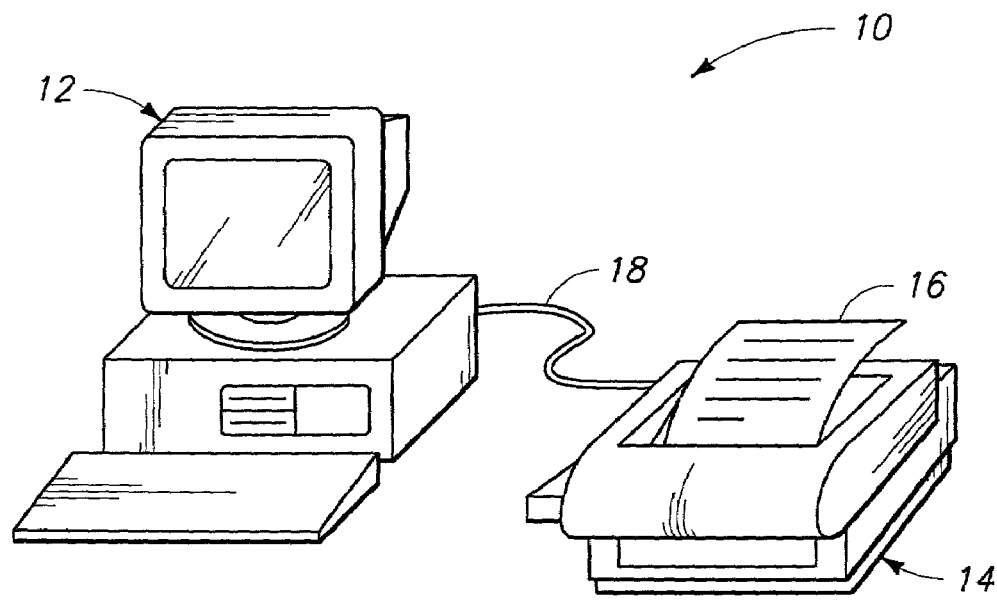
FIG. 1 is a perspective view of an image forming system.

FIG. 1 depicts an image forming system 10 including a host device 12 and an image forming device 14. In other arrangements, image forming system 10 comprises one or more host device 12 and one or more image forming device 14 individually configured to communicate with one another using a common communication medium such as a network.

An exemplary host device 12 comprises a personal computer utilizing an Intel™ processor or AMD™ processor (not shown). An exemplary image forming device 14 includes a printer, facsimile, copier, multiple-function device, or other device capable of forming hard images upon media 16 comprising paper, labels, transparencies, roll media, etc. Hard images include images provided upon output media including printed media.

Host device 12 and image forming device 14 are coupled via an appropriate communication connection 18. In an exemplary network arrangement, connection 18 is coupled with network interface cards of host device 12 and image forming device 14. In arrangements wherein image forming device 14 is dedicated to host device 12, connection 18 may comprises a simple parallel connection. Connection 18 implements communications intermediate one or more host device 12 and image forming device 14 and other arrangements of connection 18 are possible.

Figure 2:
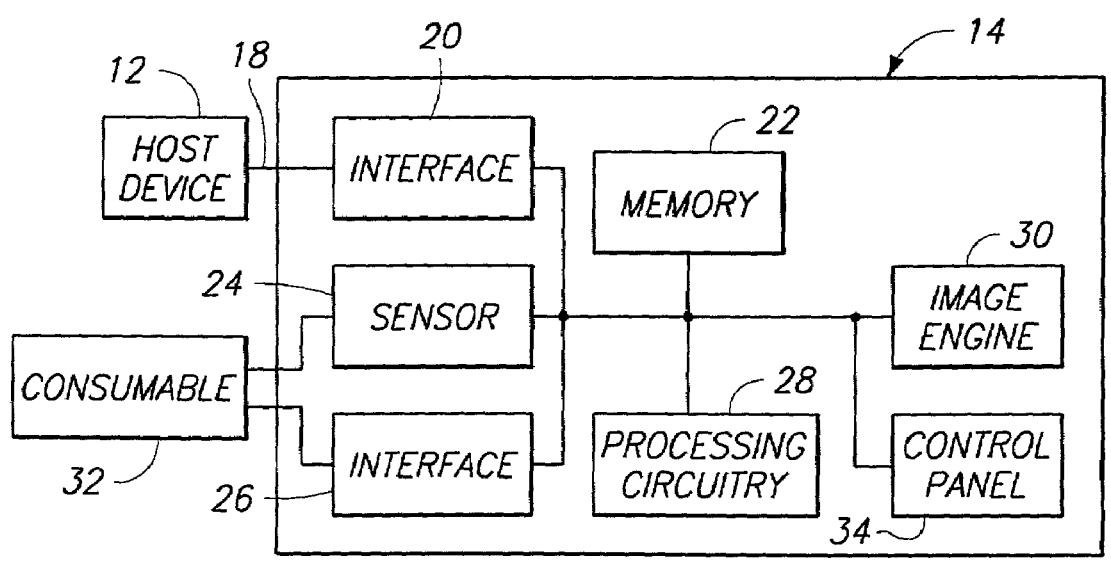
FIG. 2 is a functional block diagram of components of an exemplary image forming device of the image forming system.

Referring to FIG. 2, the depicted exemplary illustration of image forming device 14 includes an interface 20, a memory 22, a sensor 24, an interface 26, processing circuitry 28, an image engine 30 and a control panel 34. Some of the depicted components are optional and other arrangements of image forming device 14 configured to form hard images are possible. The exemplary embodiment herein will be discussed with reference to a printer application although the present invention applies to other image forming device configurations capable of forming hard images.

Interface 20 is configured to couple with connection 18 and to implement communication between host device 12 and image forming device 14. Interface 20 comprises different configurations depending upon the application of image forming device 14. For example, interface 20 comprises a network interface card (NIC) for network environments or a simple parallel connection for use in home environments or other dedicated arrangements. Image forming device 14 may access host device 12 in a dedicated arrangement, private network arrangement or public network arrangement such as the Internet.

Memory 22 stores digital information and instructions. For example, memory 22 is configured to store image data to be imaged using image engine 30, executable instructions usable by processing circuitry 28 to implement imaging operations and control operations of image forming device 14, as well as other digital data to be stored within image forming device 14. Memory 22 comprises random access memory, read only memory, and/or flash memory in one example.

As shown in FIG. 2, a consumable 32 is associated with image forming device 14 for use in the formation of hard images. Exemplary consumables include toner, sheet media, staples and any other materials consumed during the formation of hard images.

In the depicted arrangement of image forming device 14, sensor 24 is configured to monitor the status of consumable 32. For example, sensor 24 may monitor a quantity of sheet media remaining within an appropriate media tray. Alternatively, sensor 24 monitors the weight or other status of a consumable.

Interface 26 is operable to couple with consumable 32. For example, in one embodiment, interface 26 is arranged to establish electrical connection with consumable 32. U.S. Pat. No. 5,491,540, incorporated herein by reference, discusses communications between an image forming device and a consumable in one exemplary arrangement. In one instance, consumable 32 comprising toner is provided in a cartridge (not shown) which may include memory and a connection configured to couple with interface 26 of image forming device 14 and to implement communications therebetween. Data may be stored within the memory of the cartridge and transferred from the memory of the cartridge to interface 26. Other configurations are possible.

Processing circuitry 28 is configured to execute executable instructions to control operations of image forming device 14. Processing circuitry 28 controls image engine 30 to implement imaging operations. Processing circuitry 28 also performs operations with respect to maintenance and monitoring of consumables as described below. Processing circuitry 28 is configured to execute executable instructions stored within memory 22 and comprising for example, software and/or firmware instructions. Exemplary processing circuitry 28 comprises a microprocessor.

Image engine 30 implements formation of hard images upon media 16. An exemplary engine includes a developing assembly and a fusing assembly (not shown) to respectively form images using developing material and to affix the developing material to media 16. Other constructions or embodiments of image engine 30 are possible.

According to aspects of the present invention, processing circuitry 28 is configured to implement marketing operations with respect to consumables used within image forming device 14. According to one exemplary embodiment, processing circuitry 28 monitors a state of consumable 32 used within image forming device 14. Processing circuitry 28 monitors the state of a given consumable in one or more of a variety of ways, some of which are described herein.

For example, processing circuitry 28 is configured to monitor usage of the consumable 32 to monitor the state of the consumable according to a first aspect. Executable instructions may be provided within memory 22 to instruct processing circuitry 28 to count the number of dots or pixels formed on media 16 during the formation of hard images to monitor usage of the consumable.

According to another aspect, processing circuitry 28 monitors the frequency of usage of the consumable, for example, noting the number of times or number of sheets of media imaged during a given period of time.

In arrangements wherein sensor 24 is provided, processing circuitry 28 receives information regarding a consumable directly from sensor 24. Alternatively, sensor 24 is configured to set a flag responsive to consumable 32 reaching a predetermined condition and processing circuitry 28 recognizes the indicated flag set by sensor 24. In embodiments wherein interface 26 is implemented, processing circuitry 28 may receive an indication signal from interface 26 indicating insertion or other coupling of consumable 32 with image forming device 14 (e.g., insertion of a toner cartridge into image forming device 14) to indicate the state of the consumable (e.g., remaining toner quantity).

Although consumable 32 is depicted outside of image forming device 14 in FIG. 2, it is to be understood that consumable 32 may also be provided within image forming device 14 or, alternatively, one or more consumable may be external of image forming device 14 while another consumable is provided within image forming device 14 in a given configuration.

As mentioned above, interface 26 may be utilized to indicate coupling of consumable 32 with image forming device 14. According to aspects of the invention, such indicated insertion of consumable 32 may be utilized as a triggering event for marketing operations described below. The user may or may not be prompted to indicate that the cartridge is a new cartridge before the marketing operations proceed. Other triggering events are possible and include the state of consumable 32 reaching a predetermined state as indicated by sensor 24 or otherwise ascertained according to other aspects described above.

The present invention also contemplates host device 12 triggering marketing operations within image forming device 14. For example, processing circuitry 28 may be implemented to function as an embedded web server to communicate with host device 12 or other network devices as described in U.S. Pat. No. 5,956,487, incorporated herein by reference. Upon installation of image forming device 14 in an environment, such device 14 may be registered by a notification message (e.g., e-mail message) with an appropriate host device 12 such as a web connected device of the appropriate manufacturer of the image forming device 14. Following registration, host device 12 forwards marketing messages to image forming device 14 for utilization thereby as discussed herein. For example, if a new toner cartridge or other consumable is available, host device 12 can communicate a message to all registered image forming devices 14 indicating the availability of the new consumable. Similarly, a message may be communicated if a given consumable is on sale or otherwise offered at an attractive price, or for other marketing reasons.

Responsive to receiving a message from host device 12 or resulting from the monitoring of a state of consumable 32 or other triggering event, processing circuitry 28 implements marketing operations in accordance with aspects of the present invention. Following an appropriate triggering event, processing circuitry 28 is configured to control communication of a desired message regarding consumable 32 including, for example, price information of the consumable 32.

In some aspects, device 14 prompts the user directly or via host device 12 to determine whether or not they wish to receive messages regarding consumables. Further, interface 26 may be configured to detect whether or not the consumable is genuine or a non-authorized product. Depending upon the determined source of the consumable 32, it may be desired to automatically generate the messages described herein, and/or tailor the content of the message dependent upon the source of the consumable 32.

According to aspects of the present invention, the price information is provided to image forming device 14 in a plurality of methods. In one example, memory within consumable 32, as discussed within U.S. Pat. No. 5,491,540 incorporated by reference above, includes price information which is communicated to image forming device 14 using interface 26. Alternatively, memory 22 of image forming device 14 contains the price information from an initial moment in time. In another configuration, host device 12 may forward price information to image forming device 14 using interface 20. According to other aspects, processing circuitry 28 is arranged to generate a consumable information request which is communicated via interface 20 to an appropriate network and/or host device 12 as identified by an appropriate address stored within memory 22 of device 14 or other location. An exemplary address is a uniform resource locator (URL), such as hp.com. Thereafter, the appropriate host device 12 at the indicated address forwards requested price information to image forming device 14. Another example of obtaining price and/or product information is wherein host device 12 forwards the price information automatically to image forming device 14 without request from image forming device 14. The price information regarding the consumable may be stored within memory 22 (if not present already) following its reception within image forming device 14 and processing circuitry 28 may retrieve the price information from memory 22 to access the price information.

Processing circuitry 28 formulates one or more message utilizing the accessed price information regarding the consumable. Alternatively, the price information is communicated to image forming device 14 in a preformatted message and no formulation therein is necessary.

An exemplary message identifies the model number of the consumable, a description of the consumable, and price information of the consumable. Depending on the form of the message, different message formats are possible. For example, processing circuitry 28 may retrieve the price information from memory 22, formulate an appropriate message and forward the message to image engine 30 to communicate the message. Image engine 30 is configured to form at least one hard image comprising the message in the form of a coupon including the price information according to one embodiment of the present invention. Exemplary messages are "Receive 20% off your next HP toner cartridge purchase" or "Save 30% off any HP paper." Such may be utilized upon initial coupling of a new consumable with image forming device 14 and device 14 may immediately print the coupon to encourage purchase of a desired consumable as a replacement for inventory.

Alternatively, processing circuitry 28 may formulate the message as an e-mail message for communication to an appropriate host device 12. Such an exemplary message can be forwarded to the appropriate host device 12 of a system administrator or purchasing personnel, for example. The message may include a URL such as hp.com to direct the administrator or personnel to a desired purchasing location to obtain the consumable at the price indicated in the price information.

Further, processing circuitry 28 according to another aspect provides the message in proper form for communication using control panel 34. Control panel 34 includes an interface control pad for utilization by an appropriate user and a display depicts status and other messages of image forming device 14. Other messaging options exist for communication of the price information to an appropriate recipient. Messages may be communicated in any appropriate format or combination of formats, including hard images, e-mail message, control panel message, etc.

Although only one host device 12 is depicted in FIGS. 1 and 2, it is to be understood that numerous host devices 12 may be coupled with image forming device 14 via an appropriate communication medium such as a network, including the Internet. For example, a first host device may forward the price information to image forming device 14 at an appropriate moment in time while image forming device 14 may forward a message (e.g., coupon or other indication) including the price information to a second host device. The first host device may be associated with a desired supplier of the consumable (e.g., retailer, reseller, manufacturer) and the second host device may be associated with an individual responsible for replenishing the consumable.

Referring to FIG. 3 an exemplary methodology executed by processing circuitry 28 is shown. Other methods embodying aspects according to the invention are possible. For example, some steps depicted in FIG. 3 are omitted in other such methods of the invention.

Initially, at a step S10, processing circuitry 28 receives a consumable status. Exemplary consumable status is received from host device 12, sensor 24, consumable 32, and/or other source.

At step S12, it is determined whether the generation of a consumable message is proper. For example, if sensor 24 outputs information regarding a consumable, it is determined at step S12 whether the state of the consumable has reached a predetermined level (which may be set at a desired level by a system administrator) to necessitate the generation of an appropriate consumables message. If step S12 is in the negative, the depicted methodology returns to step S10. If the condition of step S12 is affirmative, the methodology proceeds to a step S14.

During step S14, processing circuitry 28 accesses consumable price information. Consumable price information is stored in memory 22 or other appropriate storage location such as upon a toner cartridge and processing circuitry 28 accesses the consumable price information for the generation of an appropriate message.

At a step S16, processing circuitry 28 formulates a message including the price information retrieved during step S14. Alternatively, the entire message is stored within memory 22 or received within image forming device 14 and formulation of the message is not required if provided in an appropriate message format, such as e-mail or raster data utilized to form hard images by image engine 30.

At a step S18, processing circuitry 28 communicates the message including the price information. As described above, processing circuitry 28 can forward the message to image engine 30 for generation of an appropriate hard image such as a coupon including the price information. Alternatively, the message is forwarded to an appropriate host device 12 or other networked device using interface 20.

Processing circuitry 28 can additionally operate control panel 34 to depict the desired message.

The protection sought is not to be limited to the disclosed embodiments, which are given by way of example only, but instead is to be limited only by the scope of the appended claims.

What is claimed is:

1. An image forming device comprising:
   an image engine configured to use a consumable to form a plurality of hard images;
   processing circuitry coupled with the image engine and configured to control the formation of the hard images, the processing circuitry being further configured to monitor a state of the consumable of the image forming device, to access price information regarding the consumable of the image forming device, and to communicate a message including the price information responsive to the monitoring;
   wherein the processing circuitry is configured to forward the message to the image engine to communicate the message, and wherein the image engine is configured to form at least one of the hard images comprising the message in a form of a coupon including the price information; and
   wherein the consumable includes the price information, and further comprising an interface configured to receive the price information from the consumable.

2. The device in accordance with claim 1 further comprising an interface adapted to couple with a host device external of the image forming device and to receive the price information from the host device.

3. The device in accordance with claim 1 further comprising an interface adapted to couple with a host device external of the image forming device, and wherein the processing circuitry is configured to communicate the message to the host device using the interface.

4. The device in accordance with claim 1 wherein the processing circuitry is configured to monitor usage of the consumable to monitor the state of the consumable.

5. The device in accordance with claim 1 wherein the processing circuitry is configured to monitor frequency of usage of the consumable to monitor the state of the consumable.

6. The device in accordance with claim 1 wherein the processing circuitry is configured to monitor insertion of the consumable into the image forming device to monitor the state of the consumable.

7. The device in accordance with claim 1 wherein the processing circuitry is configured to receive information regarding the state of the consumable to monitor the state of the consumable.

8. The device in accordance with claim 1 further comprising an interface adapted to couple with a host device external of the image forming device, and wherein the processing circuitry is configured to generate a consumable information request to access the price information, and wherein the interface is configured to Communicate the request to the host device and to receive the price information after the communication of the request.

9. The device in accordance with claim 1 further comprising memory configured to store the price information, and wherein the processing circuitry is configured to retrieve the price information from the memory to access the price information.

10. The device in accordance with claim 1 wherein the processing circuitry is configured to access the message to access the price information.

11. The device in accordance with claim 1 wherein the image engine comprises a print engine configured to use the consumable to print the hard images.

12. A consumable marketing method comprising:
    providing an image forming device configured to use a consumable to form a plurality of hard images;
    monitoring a state of the consumable of the image forming device;
    accessing price information regarding the consumable of the image forming device;
    communicating a message including the price information of the consumable responsive to the monitoring including communicating the message to an external host device; and
    wherein the accessing comprises receiving the price information from the consumable.

13. The method in accordance with claim 12 further comprising receiving the price information from an external host device coupled with the image forming device.

14. The method in accordance with claim 12 wherein the communicating further comprises forming a hard image comprising the message in a form of a coupon including the price information.

15. The method in accordance with claim 12 wherein the monitoring comprises monitoring usage of the consumable.

16. The method in accordance with claim 12 wherein the monitoring comprises monitoring frequency of usage of the consumable.

17. The method in accordance with claim 12 wherein the monitoring comprises monitoring insertion of the consumable into the image forming device.

18. The method in accordance with claim 12 wherein the monitoring comprises receiving the state of the consumable.

19. The method in accordance with claim 12 wherein the accessing comprises communicating a consumable information request to a host device and receiving the price information after the communicating.

20. The method in accordance with claim 12 wherein the providing comprises providing a printer.

21. The method in accordance with claim 12 wherein the accessing comprises accessing the message.

22. A consumable marketing method comprising:
    providing a printer configured to use a consumable to print a plurality of hard images;
    providing a host device configured to communicate with the printer;
    accessing price information regarding the consumable from the consumable;
    monitoring a state of the consumable;
    formulating a message regarding the consumable comprising a coupon including the price information; and
    communicating the message responsive to the monitoring, the communicating comprising at least one of printing the message and outputting the message to the host device.

* * * * *